US008156234B1

(12) United States Patent
Sun et al.

(10) Patent No.: US 8,156,234 B1
(45) Date of Patent: Apr. 10, 2012

(54) MULTICAST DISTRIBUTION OF COMPUTER VIRUS PATTERN FILES WITH FAIL OVER MECHANISM

(75) Inventors: Chih-Yao Sun, Taipei (TW); Tzun-Liang Wang, Kaohsiung (TW)

(73) Assignee: Trend Micro Incorporated, Tokyo (JP)

( * ) Notice: Subject to any disclaimer, the term of this patent is extended or adjusted under 35 U.S.C. 154(b) by 1092 days.

(21) Appl. No.: 12/070,021

(22) Filed: Feb. 14, 2008

(51) Int. Cl.
*G06F 15/16* (2006.01)

(52) U.S. Cl. ........................................ 709/231
(58) Field of Classification Search ............. 717/172; 709/231
See application file for complete search history.

(56) References Cited

U.S. PATENT DOCUMENTS

| | | | |
|---|---|---|---|
| 6,188,674 B1 * | 2/2001 | Chen et al. | 370/252 |
| 6,269,080 B1 * | 7/2001 | Kumar | 370/236 |
| 6,269,456 B1 * | 7/2001 | Hodges et al. | 714/38.1 |
| 6,535,924 B1 * | 3/2003 | Kwok et al. | 709/242 |
| 6,839,865 B2 * | 1/2005 | Gould et al. | 714/6 |
| 6,941,501 B2 * | 9/2005 | Eguchi et al. | 714/751 |
| 6,966,059 B1 * | 11/2005 | Shetty et al. | 717/172 |
| 7,047,306 B2 * | 5/2006 | Zee et al. | 709/231 |
| 7,159,036 B2 | 1/2007 | Hinchliffe et al. | |
| 7,529,820 B2 * | 5/2009 | Eatough et al. | 709/223 |
| 7,624,423 B1 * | 11/2009 | Eatough | 726/1 |
| 7,756,992 B1 * | 7/2010 | Zhao | 709/231 |
| 7,945,924 B2 * | 5/2011 | Li et al. | 725/9 |
| 8,051,483 B2 * | 11/2011 | Fang et al. | 726/24 |
| 2001/0034788 A1 * | 10/2001 | McTernan et al. | 709/232 |
| 2003/0110392 A1 * | 6/2003 | Aucsmith et al. | 713/200 |
| 2008/0008167 A1 * | 1/2008 | Ver Steeg | 370/389 |
| 2009/0240701 A1 * | 9/2009 | Gautier et al. | 707/10 |

FOREIGN PATENT DOCUMENTS

WO    WO 2007122503 A2 * 11/2007

OTHER PUBLICATIONS

Scalable and Reliable Multicast File Transfer Architecture, Pro ceedings Inet 1999, pp. 1-10, [retrieved on Jan. 24, 2008]. Retrieved from the internet: http://www.isoc.org/inet99/proceedings/4b/4b_1.htm.*
Symantec Ghost Solution Suite Version 2.0 Data Sheet: Enterprise, 2006, pp. 1-4, Copyright Symantec Corporation.
Scalable and Reliable Multicast File Transfer Architecture, Proceedings Inet 1999, pp. 1-10, [retrieved on Jan. 24, 2008]. Retrieved from the internet: http://www.isoc.org/inet99/proceedings/4b/4b_1.htm.
Multicast—Wikipedia the free encyclopedia, Jan. 24, 2008, pp. 1-4, [retrieved on Jan. 28, 2008]. Retrieved from the internet: http://en.wikipedia.org/wiki/Muticast.

* cited by examiner

*Primary Examiner* — Wei Zhen
*Assistant Examiner* — Daxin Wu
(74) *Attorney, Agent, or Firm* — Okamoto & Benedicto LLP (57) ABSTRACT

Components of an antivirus program may be updated by multicasting fragments of the update and unicasting missed fragments. The components may include a virus pattern file. The virus pattern file may be divided into several file fragments, with each file fragment being multicast to several client computers. The client computers may receive the file fragments and assemble them into the virus pattern file. The file fragments may be multicast in several rounds. When a client computer misses a file fragment, that client computer may request the missing file fragment from a server computer, which may unicast the missing file fragment to the client computer. An announcement indicating the name of the virus pattern file, the number of file fragments that form the virus pattern file, and the designated server from which to request and receive missed file fragments may be multicast to the client computers prior to the file fragments.

12 Claims, 7 Drawing Sheets

MULTICAST DISTRIBUTION OF COMPUTER VIRUS PATTERN FILES WITH FAIL OVER MECHANISM

BACKGROUND OF THE INVENTION

1. Field of the Invention

The present invention relates generally to computer security, and more particularly but not exclusively to methods and apparatus for distributing updates to computer security modules.

2. Description of the Background Art

Multicast file transmission is a well known one-to-many communication where a single sender sends data simultaneously to multiple receivers belonging to a multicast group. IP (Internet Protocol) multicast refers to multicasting over the Internet and other IP-based computer networks. Generally and in the context of the present disclosure, the term "multicast" refers to "IP multicast."

The present disclosure pertains to the use of multicast file transmission to distribute updates to computer security modules, such as antivirus programs.

SUMMARY

Components of an antivirus program may be updated by multicasting fragments of the update and unicasting missed fragments. The components may include a virus pattern file. The virus pattern file may be divided into several file fragments, with each file fragment being multicast to several client computers. The client computers may receive the file fragments and assemble them into the virus pattern file. The file fragments may be multicast in several rounds. When a client computer misses a file fragment, that client computer may request the missing file fragment from a server computer, which may unicast the missing file fragment to the client computer. An announcement indicating the name of the virus pattern file, the number of file fragments that form the virus pattern file, and the designated server from which to request and receive missed file fragments may be multicast to the client computers prior to the file fragments.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Computer viruses, worms, Trojans, rootkits, and spyware are examples of malicious codes that have plagued computer systems throughout the world. Although there are technical differences between each type of malicious code, malicious codes are collectively referred to herein as "viruses." For example, commercially available "antivirus software" is designed to scan a computer for viruses as well as worms and other malicious codes.

Figure 1:
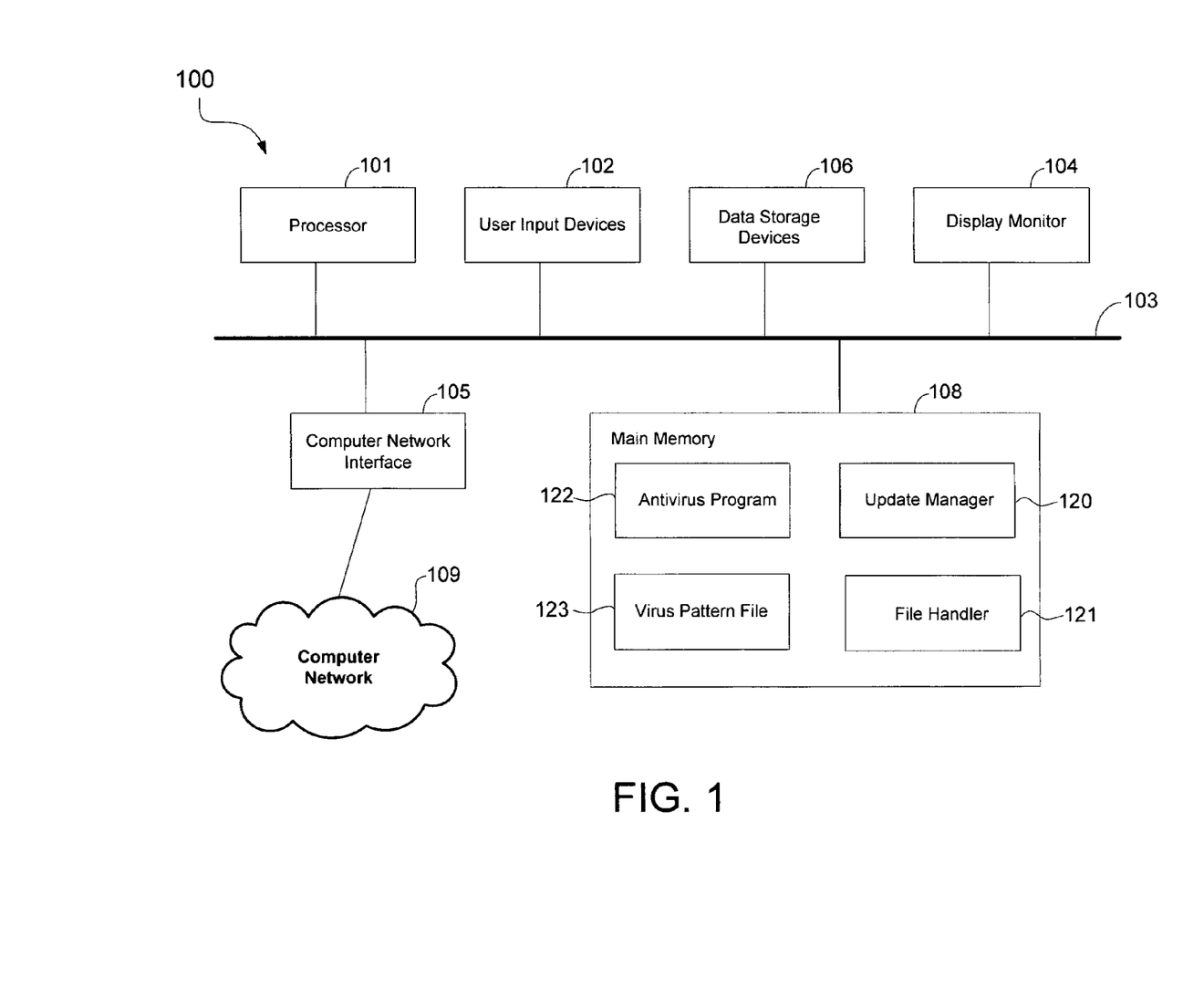
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a client computer, for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes an update manager 120, a file handler 121, an antivirus program 122, and a virus pattern file 123. The just mentioned components may be loaded from the data storage device 106 to the main memory 108 for execution by the processor 101.

The antivirus program 122 may comprise computer-readable program code for protecting the computer 100 from computer-related threats, such as viruses, spam e-mails, web threats, and so on.

In one embodiment, the antivirus program 122 comprises a commercially-available antivirus program, such as those available from Trend Micro, Inc., while the virus pattern file 123 comprises corresponding data for detecting and eliminating viruses. For example, the virus pattern file 123 may include virus signatures or patterns that the antivirus program 122 may employ to scan data for viruses.

The update manager 120 may comprise computer-readable program code for communicating with external computers, such as server computers, to receive updates for the antivirus program 122 including its pattern file 123. In one embodiment, the update manager 120 is configured to receive update file fragments transmitted by multicast file transmission over the Internet and to provide the update file fragments to the file handler 121. The update manager 120 may also be configured to request a missed update file fragments by unicast file transmission.

The file handler 121 may comprise computer-readable program code for assembling update file fragments into an update file suitable for updating one or more components of the antivirus program 122, such as the pattern file 123. The file handler 121 may be configured to receive update file fragments from the update manager 120, create the update file using the update file fragments, and, if necessary, identify missing update file fragments needed to create the update file. The file handler 121 may be configured to inform the update manager 120 of missing update file fragments so that the update manager 120 may accordingly request the missing update file fragments from a designated server.

The main difference between virus pattern file distribution and regular file distribution is time limit. Pattern files have to be continually updated, typically every 6 to 24 hours, or more often. This is primarily because viruses need to be contained as soon as they are discovered. Otherwise, viruses will propagate like wildfire over the Internet. Also, updates to pattern files have a fixed time period, and are thus superceded by a subsequent update if not delivered on time.

Although current multicast file transmission techniques generally work for regular file distribution, they are not suitable for transmitting time-critical files, like virus pattern files. More specifically, currently available multicast file transmission techniques do not have an adequate fail over mechanism for handling missed transmissions. A conventional multicast file transmission approach involves sending multiple file fragments to the multicast group repeatedly and continuously. As long as the sender sends the file fragments long enough, the receivers have a better chance of getting all of the file fragments to recreate the file.

One possible approach to multicast file transmission, which is not appropriate for antivirus components, is to assume that all file fragments will be received, i.e., do not care about missing file fragments. A second possible approach is to have a fail over mechanism wherein receivers that missed certain file fragments can request the sender to multicast the missed files again. A problem with the second approach when applied to antivirus components is that an update server may deploy 50 MB virus pattern files to 300,000 client computers in a relatively short amount of time. If even 50,000 client computers missed received certain fragments of a pattern file being distributed, the resulting retransmission request to the sender can disrupt normal file distribution.

Figure 2:
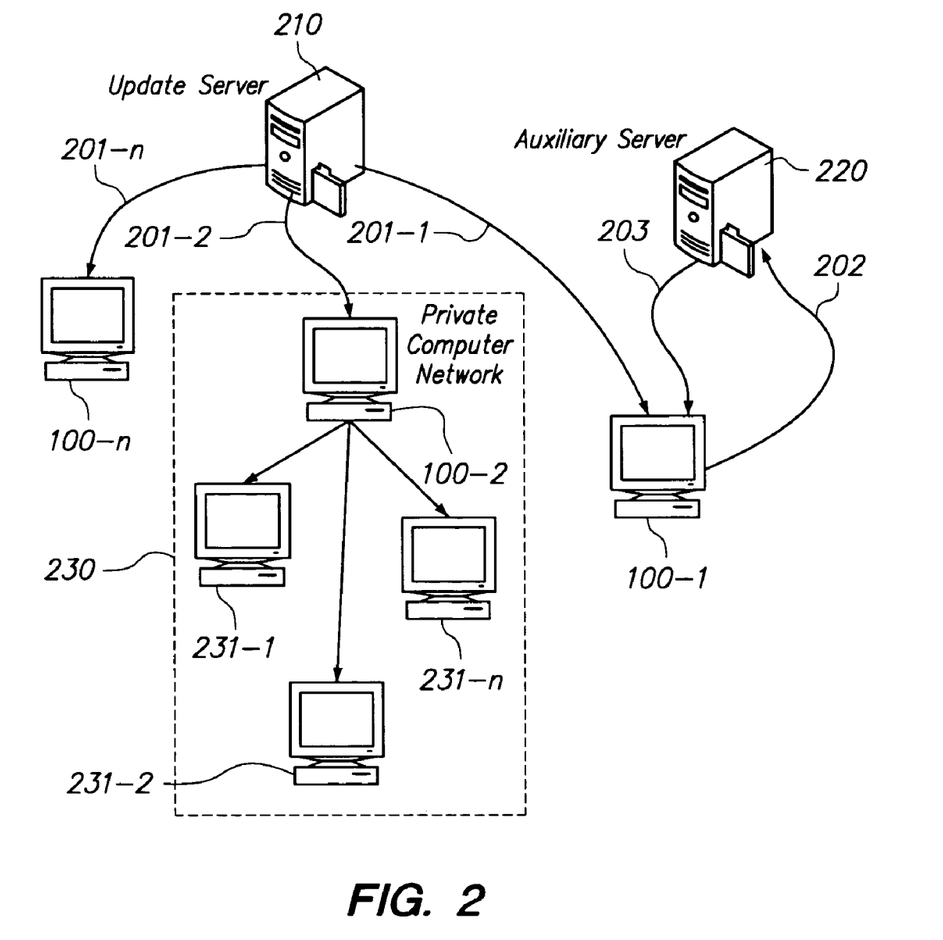
FIG. 2 shows a flow diagram illustrating the operation of a computer in accordance with an embodiment of the present invention.

FIG. 2 shows a flow diagram illustrating the operation of a computer 100 in accordance with an embodiment of the present invention. In the example of FIG. 2, an update server 210 is a server computer configured to provide updates to antivirus programs 122 running in subscribing computers 100 (i.e., 100-1, 100-2, . . . , 100-n). An auxiliary server 220 may comprise a server computer configured to provide update file fragments to requesting computers 100 that missed receiving the file fragments. This advantageously reduces the load on the update server 210 and helps minimize disruption of multicast file transmission of file fragments. The update server 210 and the auxiliary server 220 may be operated and maintained by the vendor of the antivirus program 122. The update server 210 and the auxiliary server 220 may communicate over the Internet.

In one embodiment, the update server 210 periodically provides update files to keep a virus pattern file 123 current to address newly discovered viruses or vulnerabilities. The update server 210 may be configured to divide an update into several units and multicast the units to the computers 100 in several rounds. For example, the update server 210 may divide a pattern file into several file fragments and multicast the file fragments separately in several rounds.

In an example operation, the update server 210 includes an updated virus pattern file for distribution to the computers 100. The update server 210 divides the pattern file into several file fragments and multicasts each of the file fragments to the computers 100 (see arrow 201-1, 201-2, . . . , 201-n). In one embodiment, the update server 210 distributes updates to computers 100 in accordance with IPv6 multicast. IPv6 multicast, in general, is well known and described in RFC 3515, RFC 2710, and RFC 3307, for example. Compared to IPv4 broadcast, IPv6 multicast provides clearer implementation requirements and also includes more security standards, such as IPSec.

Unlike IPv6 unicast (which sends to a single point address), IPv6 multicast is a group based communication channel. A multicast IPv6 group is a group of receivers that want to receive a particular data stream. The major function of a multicast file sender, such as the update server 210, is to basically slice a file into multiple file fragments and send the file fragments to a multicast group repeatedly. One advantage of multicasting is that the total number of packets from the sender, not counting retransmissions, is essentially the same regardless of the number of receivers. Multicast file transmission thus becomes more cost effective as the number of receivers increase.

In the example of FIG. 2, the computers 100 belong to a multicast group. The update server 210 sends updates to the multicast group, using the same number of packets to send the updates independent of the number of computers 100 in the group. This potentially lowers the costs associated with transmitting virus pattern file updates over the Internet. To minimize network traffic, a computer 100 may receive pattern file fragments as part of the multicast group and then provide the assembled pattern file to computers 231 (i.e., 231-1, 231-2, . . . , 231-n). In the example of FIG. 2, the computers 231 belong to the same private computer network as the computer 100-2 but do not belong to the multicast group comprising the computers 100. The computers 231 thus do not receive multicast transmissions from the update server 210.

Figure 3:
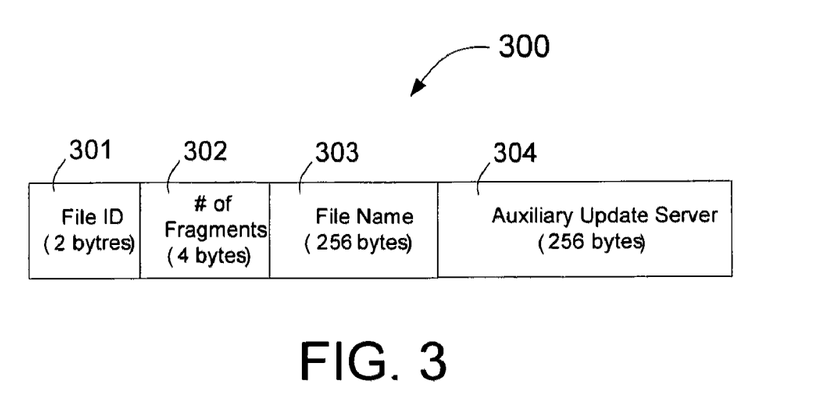
FIG. 3 shows a multicast file announcement packet in accordance with an embodiment of the present invention.
Figure 4:
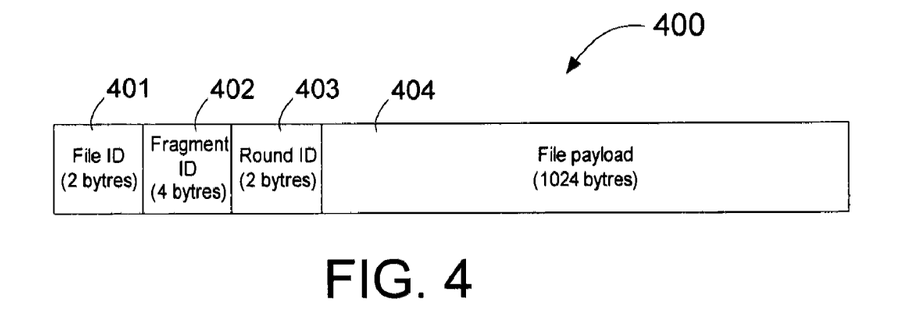
FIG. 4 shows a multicast file fragment packet in accordance with an embodiment of the present invention.

In one embodiment, the update server 210 is configured to multicast two types of packets to the computers 100: a multicast file announcement (MFA) packet 300 (see FIG. 3) and a multicast file fragment (MFF) packet 400 (see FIG. 4).

Referring to FIG. 3, there is shown an MFA packet 300 in accordance with an embodiment of the present invention. The MFA packet 300 provides information about the virus pattern file that will be multicast to the computers 100. The MFA packet 300 may include fields indicating the file ID of the virus pattern file (field 301), the total number of file fragments comprising the pattern file (field 302), the file name of the pattern file (field 303), and the auxiliary server configured to service requests for retransmission of missed file fragments (field 304).

The auxiliary server configured to service requests for retransmission of missed file fragments may be any designated server computer, including the update server 210. Preferably, the auxiliary server is different from the update server 210 to minimize disruption to the multicast file transmission of file fragments. In the example of FIG. 2, the address of the auxiliary server 220 is indicated in the field 304 of the MFA packet 300. This allows the computer 100-1 to locate the auxiliary server 220 and ask for retransmission of a missed file fragment (see arrow 202), if any, over a single communication connection, between the computer 100-1 and the auxiliary server 220. In response, the auxiliary server 220 unicasts (i.e., one-to-one data transmission) the requested file fragment to the requesting computer 100-1 (see arrow 203). In one embodiment, a computer 100 receives unicast missed file fragments by conventional TCP/IP one-to-one communication. That is, a missed file fragments is sent from the designated server to a single, requesting computer 100, which is the computer 100-1 in this example.

FIG. 4 shows an MFF packet 400 in accordance with an embodiment of the present invention. A MFF packet 400 contains a file fragment of the pattern file. The number of MFF packets 400 needed to assemble the pattern file is indicated in the corresponding MFA packet 300 (see field 302 in FIG. 3). An MFF packet 400 may include fields indicating the file ID of the virus pattern file (field 401), the file fragment ID (field 402), the transmission round (field 403), and a payload containing the file fragment (field 404). In one embodiment, the payload is limited to 1024 bytes to have a packet size that is smaller than the Microsoft Windows™ operating system maximum transmission unit (MTU) of 1500 bytes. The file ID field in an MFF packet 400 may be matched with the file ID field (field 301 in FIG. 3) of the corresponding MFA packet 300. In one embodiment, the file fragment ID (field 402) is sequential but is different for different pattern files. This allows an auxiliary server or the update server to readily identify the missing file fragment from a file fragment ID received from a requesting computer 100.

FIGS. 5-8 show call diagrams illustrating distribution of virus pattern file updates in accordance with an embodiment of the present invention. The call diagrams of FIGS. 5-8 may be performed using the components shown in FIGS. 1 and 2. Other components may also be used without detracting from the merits of the present invention.

In an example scenario, the update server 210 first multicasts an MFA packet 300 announcing the multicast transmission of the updated virus pattern file to the multicast group comprising the computers 100. The update server 210 then sends the corresponding MFF packets 400 in several rounds to increase the probability that all file fragments needed to assemble the virus pattern file is received by computers 100 in the multicast group. In the example of FIGS. 5-8, T(ann) represents the time interval that the update server 210 multicasts MFA packets 300 and T(send) represents the time of each round where the update server 210 multicasts MFF packets 400 for a particular MFA packet 300.

Figure 5:
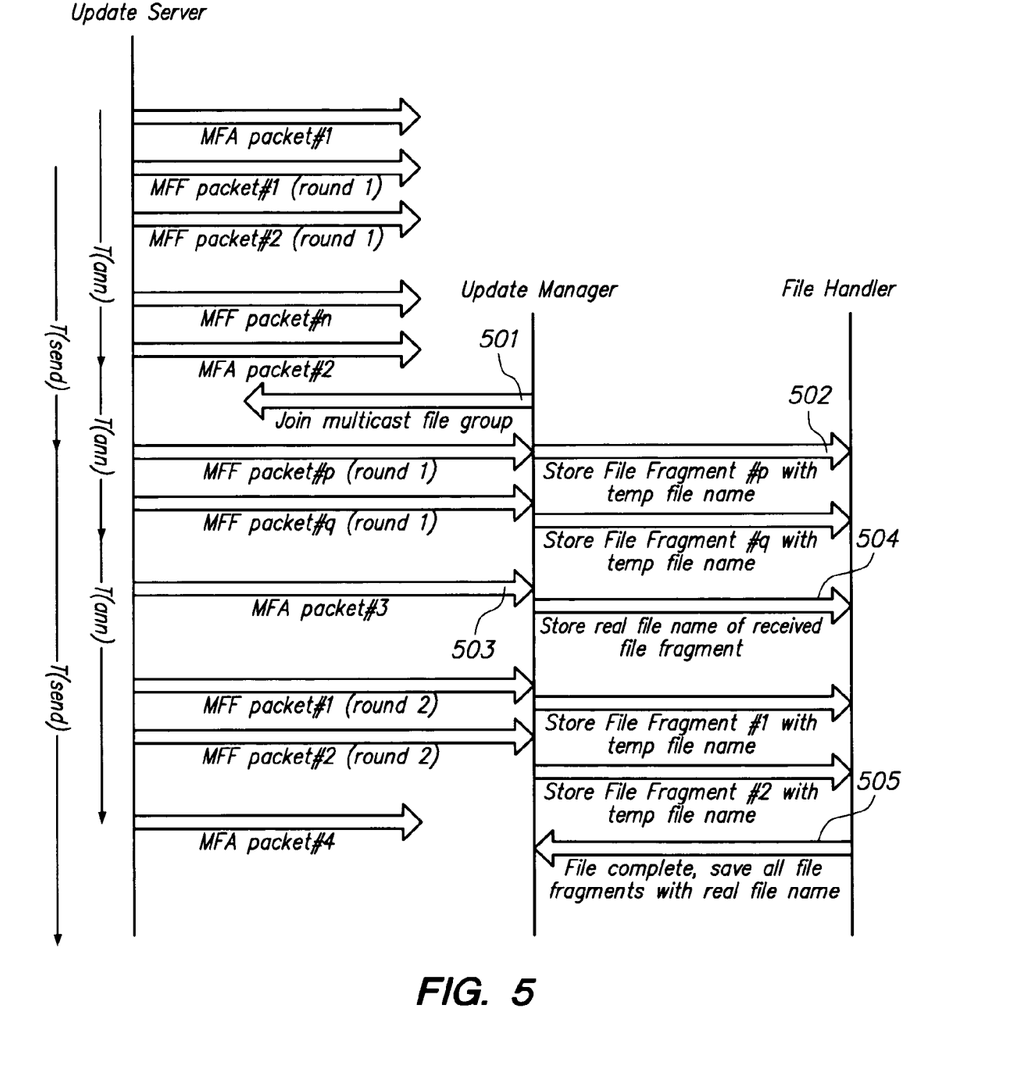
FIGS. 5-8 show call diagrams illustrating distribution of virus pattern file updates in accordance with an embodiment of the present invention.

The call diagram of FIG. 5 is for a typical multicast distribution of virus pattern files. A computer 100 may join the multicast group comprising the computers 100 at any time. In the example of FIG. 5, the update server 210 has been sending MFA packets 300 and MFF packets 400 for quite some time. However, a computer 100 may have just been installed with an antivirus program 122, virus pattern file 123, update manager 120, and file handler 121. In that case, the update manager 120 includes the joining computer 100 to the multicast group by registering with the update server 210 (see arrow 501). This allows the computer 100 to receive multicast MFA packets 300 and MFF packets 400 from the update server 210. In the computer 100, the update manager 120 receives MFA packets 300 and MFF packets 400 and forwards them to the file handler 121. The file handler 121 stores file fragments that cannot yet be assembled to the pattern file with temporary file names (e.g., see arrow 502) according to file ID (field 301 in FIG. 3; field 401 in FIG. 4).

In the example of FIG. 5, the update manager 120 receives its first MFA packet 300 (see arrow 503) sometime after joining the multicast group. The update manager 120 receives the MFA packet 300, looks up the file name of the pattern file (field 303 in FIG. 3), and stores the file name for later use (arrow 504). The update manager 120 continually receives, and forwards to the file handler 121, associated MFF packets 400 sometime after that. Each MFA packet 300 includes a set of associated MFF packets 400 that when assembled form a particular virus pattern file. The MFA packet 300 and associated MFF packets 400 for a particular virus pattern file are sent in several rounds to increase the chance of every computer 100 in the group receiving all the file fragments needed to assemble the pattern file.

Once the file handler 121 receives MFF packets 400 for all the file fragments indicated in the corresponding MFA packet 300, the file handler 121 assembles the pattern file and saves it (see arrow 505) under its real file name. The file handler 121 checks the integrity of the just assembled pattern file (e.g., by CRC or other technique) and then informs the update manager 120 to stop receiving MFA packets 300 and MFF packets 400 with the same file ID as that for the just assembled pattern file. The just assembled pattern file may be used to update or replace the existing virus pattern file (see 123 in FIG. 1) in the computer 100.

Multicast transmission in accordance with embodiments of the present invention includes a fail over mechanism for handling missed file fragments. Unlike in regular file transmission, virus pattern files need to be delivered reliably and on time. As mentioned, an MFA packet 300 may include a field for indicating the number of file fragments comprising the pattern file (field 302 in FIG. 3), while an MFF packet 400 may include a field indicating the fragment ID (field 402) of the file fragment. The fragment ID may be configured to be sequential and expected by a computer 100 to come one after another in any particular round. That is, the fragment ID may be treated as a sequence number for determining if any file fragment has been missed. For example, receiving an MFF packet 400 with a fragment ID of "5" right after receiving an MFF packet 400 with a fragment ID of "3" indicates that an MFF packet 400 with a fragment ID of "4" has been missed. In that case, the update manager 120 may initiate a timeout timer for each missed file fragment and an overall timeout counter for all the missed file fragments. If a missing file fragment is received before a predetermined timeout period (e.g., by number of rounds or timeout time) expires, the timeout timer for that file fragment is canceled. The overall timeout timer may be canceled only after all timeout timers have been canceled. If an overall or individual file fragment timeout counter expires before receiving the missed file fragment, the update manager 120 may initiate a fail over mechanism of receiving the missing file fragment from the server designated for this purpose, such as the server indicated in the field 304 of the corresponding MFA packet 300 (see FIG. 3). In the example of FIG. 2, that server is the auxiliary server 220.

Figure 6:
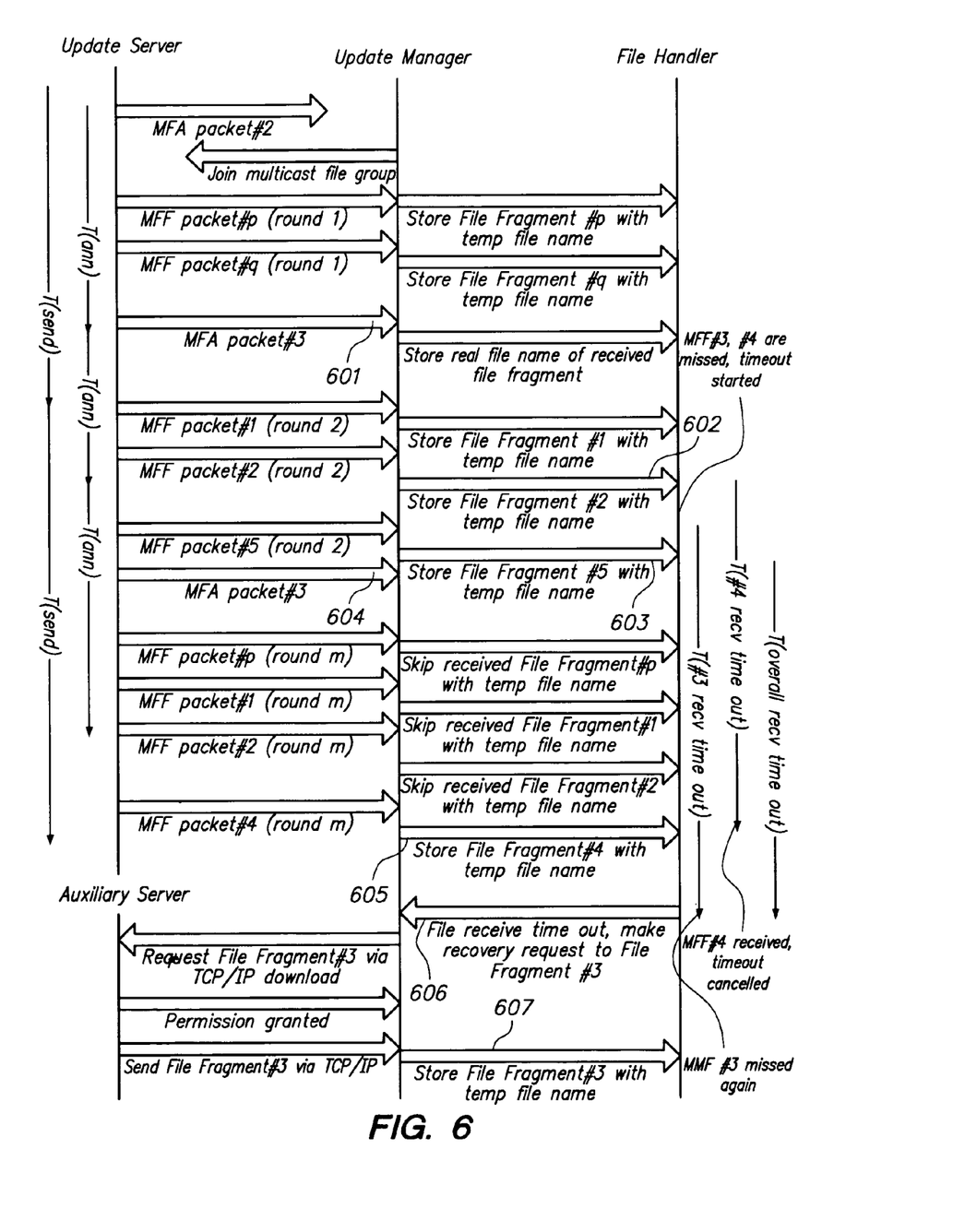

FIG. 6 shows a call diagram illustrating the just described fail over mechanism for identifying and receiving missed file fragments. In one embodiment, a file fragment is included in the payload of an MFF packet 400 (field 404 in FIG. 4), so missing an MFF packet 400 is the same as missing a file fragment of the pattern file. In the example of FIG. 6, the update manager 120 receives MFA packets 300 and MFF packets 400 in several rounds from the update server 210. At some point, the update server 210 sends out an MFA packet 300 (arrow 601), which is labeled as MFA packet #3 in the example of FIG. 6. The update manager 120, and thus the file handler 121, then starts to receive MFF packets 400 for that MFA packet. Subsequently, the file handler 121 receives an out of sequence file fragment, which in the example of FIG. 6 is a file fragment #5 (arrow 603) received right after receiving a file fragment #2 (arrow 602) for the MFA packet #3. This indicates that the computer 100 failed to receive the intervening file fragments, which in the example of FIG. 6 are file fragments #3 and #4. At that point, the file handler 121 starts individual receive timeout timers for file fragments #3 and #4 and an overall receive timeout timer. The file handler 121 then waits to receive the missing file fragments within the timeout periods of the aforementioned timeout timers. The timeout periods may be in terms of a number of rounds (e.g., receivers will expect only 100 rounds of multicast transmission) or time duration (e.g., an expiration time window of 4 hours). The file handler 121 eventually receives the file fragment #4 (arrow 605) in a subsequent multicast transmission of the MFA packet #3 (arrow 604) and associated MFF packets in another round, and accordingly cancels the receive timeout timer for the file fragment #4. However, the file handler 121 fails to receive the file fragment #3 before the receive timeout timer for the file fragment #3 and the overall receive timeout timer expire. In response, the file handler 121 requests the update manager 120 to receive the missed file fragment #3 from the designated auxiliary update server indicated in the field 304 of the corresponding MFA packet 300 (arrow 606), which in this example is auxiliary server 220. The update manager 120 proceeds to receive the missed file fragment #3 from the auxiliary server 220 and provides the file fragment to the file handler 121 (arrow 607).

Figure 9:
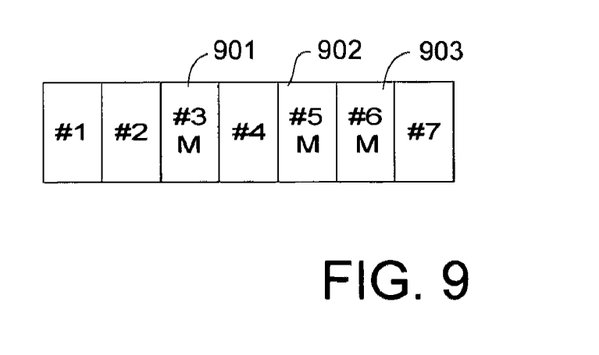
FIG. 9 shows an example payload that may be sent to a server to request for missed file fragments in accordance with an embodiment of the present invention.

In the example of FIG. 6, the update manager 120 receives missing file fragments from the auxiliary server 220 using conventional TCP/IP download. For example, the update manager 120 may send a packet to the auxiliary server 220 particularly identifying the packet by file fragment ID (see field 402 in FIG. 4). In one embodiment, the file fragment ID is sequential but unique (or pseudo unique) for each pattern file. This allows the auxiliary server 220 to identify the missing file fragment from the file fragment ID received from the update manager 120. FIG. 9 shows an example payload that may be sent by the update manager 120 to the auxiliary server 220 (or another server designated to provide the missed file fragments) in accordance with an embodiment of the present invention. In the example of FIG. 9, the payload lists all of the file fragment ID's of a corresponding file pattern and includes a marking ("M" in the example of FIG. 9; fields 901, 902, and 903) identifying the missing ones that need to be retransmitted to the requesting computer 100. Requesting for and receiving only particular file fragments, rather than the entire pattern file, and identifying missed file fragments in a single payload advantageously minimize network traffic.

In one embodiment, individual receive timeout timers for missed file fragments and the overall receive timeout timer are started upon discovery of the missing file fragments. The overall receive timeout timer is started whenever an individual receive timeout timer is started, and stays active until all individual receive timers have been canceled.

Figure 7:
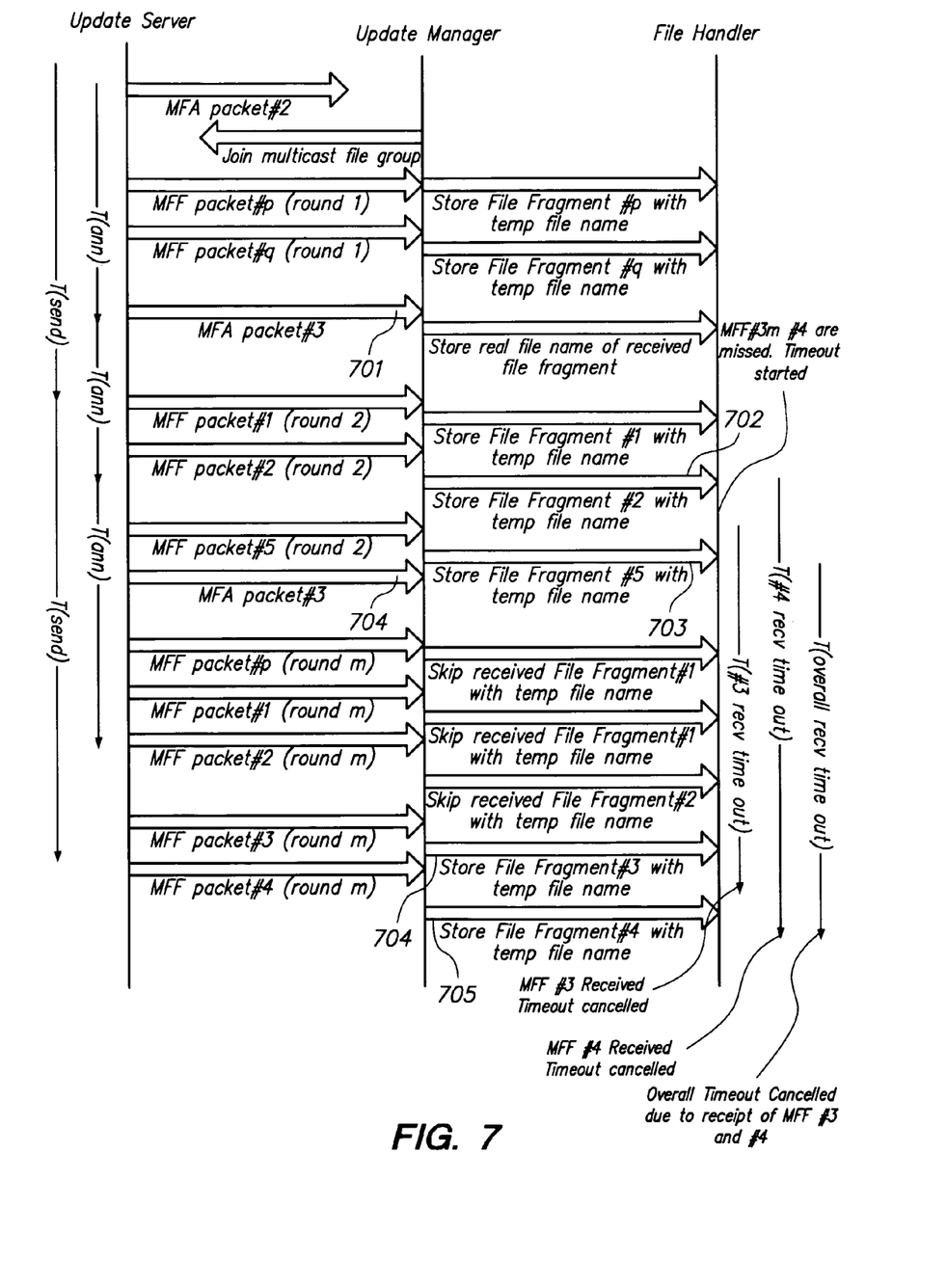

The call diagram of FIG. 7 is similar to that of FIG. 6, where the update server sends out an MFA packet 300 labeled as MFA packet #3 (arrow 701) and then sends out associated MFF packets 400 for that MFA packet. The file handler 121 receives out of sequence MFF packets #2 (arrow 702) and #5 (arrow 703), indicating that file fragments #3 and #4 have been missed. The file handler 121 accordingly starts individual receive timeout timers for the missing file fragments and the overall receive timeout timer. However, in a subsequent round of multicast transmission of the MFA packet #3 (arrow 704) and associated MFF packets, the file handler 121 receives the file fragment #3 (arrow 704) and accordingly cancels the receive timeout timer for the file fragment #3. The overall timeout timer remains active until after the file handler 121 receive the file fragment #4 (arrow 705), at which point the file handler 121 cancels the receive timeout timer for the file fragment #4 and the overall timeout timer since there is no other active receive timeout timer.

In one embodiment, the starting time of the overall receive timeout timer is shifted to match the starting time of the earliest started remaining individual receive timeout timer. For example, when the overall receive timeout timer is started with a first individual receive timeout timer, and a second individual receive timeout timer is started after the first individual receive timeout timer, the starting time of the overall receive timeout timer is the same as that for the first individual receive timeout timer. When the first individual receive timeout timer is canceled, the starting time of the overall receive timeout timer is shifted to be the same as that of the second individual receive timeout timer assuming the second individual receive timeout timer is still active. This assures that the overall receive timeout timer will expire with the individual receive timeout timer with the least time or round remaining.

Figure 8:
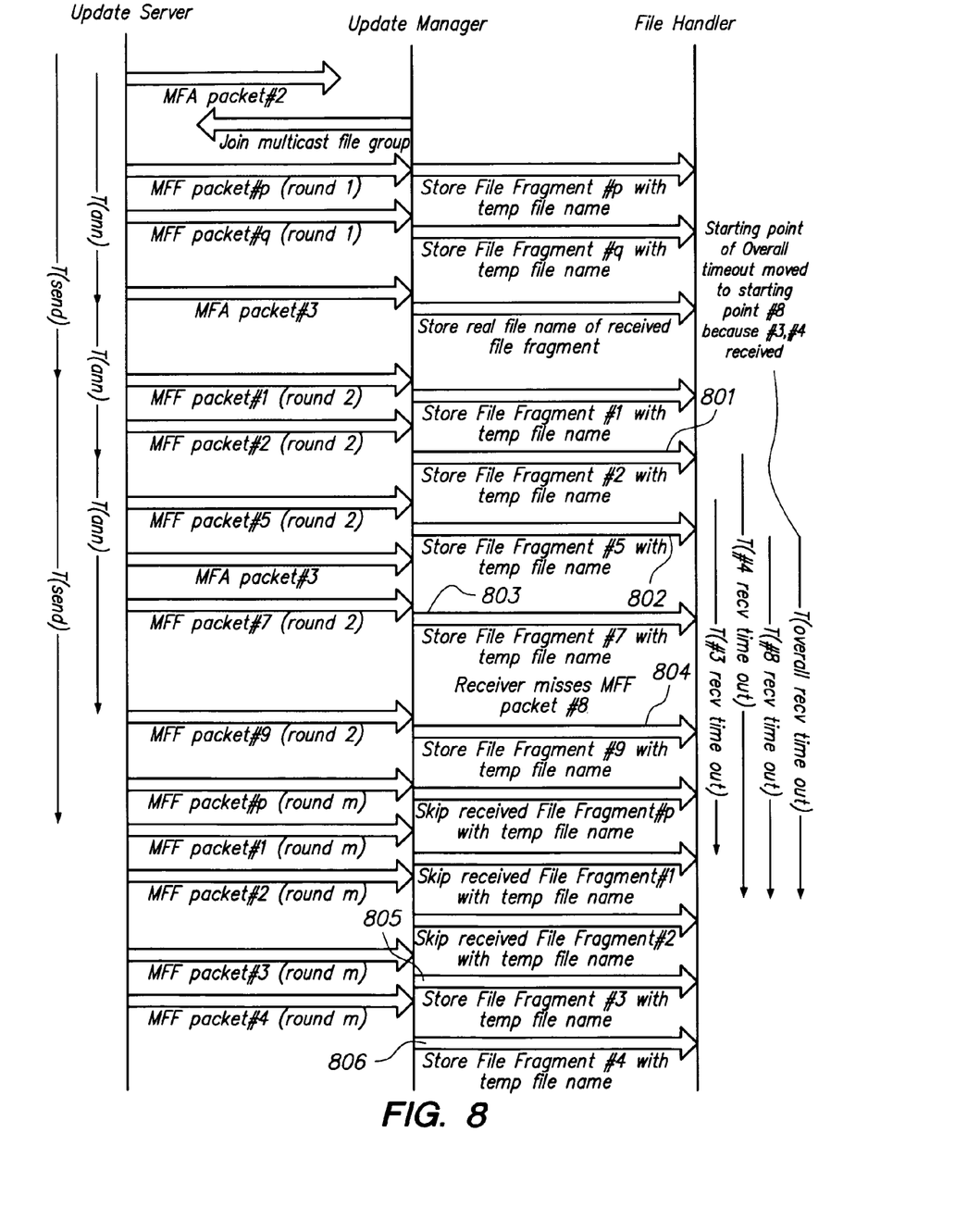

In the example of FIG. 8, the file handler 121 fails to receive file fragments #3 and #4 (between arrows 801 and 802), and accordingly starts individual receive timeout timers for each one. At a later time, the file handler 121 also fails to receive file fragment #8 (between arrows 803 and 804). When the file handler 121 receives the file fragments #3 (arrow 805) and #4 (arrow 806), the file handler 121 resets the starting time of the overall receive timeout timer from the starting time of the receive timeout timers for file fragments #3 and #4 to that of the file fragment #8.

Reliable and cost-effective techniques for multicast transmission of updates to computer security modules have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of distributing components of an antivirus program, the method comprising:
   receiving information on a number of file fragments of a virus pattern file and information on a server computer configured to provide missing file fragments to client computers in a multicast group;
   receiving a multicast of a first file fragment of the virus pattern file, the first file fragment being multicast to a plurality of client computers subscribing to receive updates of an antivirus program that uses the virus pattern file and belonging to the multicast group;
   receiving a multicast of a second file fragment of the virus pattern file, second file fragment being multicast to the plurality of client computers belonging to the multicast group;
   determining if a particular file fragment for the virus pattern file has not been received using the received information on the number of file fragments of the virus pattern file; and
   when the particular file fragment for the virus pattern file has not been received, requesting the server computer to provide the particular file fragment and receiving a unicast of the particular file fragment from the server computer in response to the request,
   wherein the server computer identifies the particular file fragment from a packet payload identifying a file fragment ID of the particular file fragment.

2. The method of claim 1 further comprising:
assembling the first and second file fragments together with other file fragments into the virus pattern file.

3. The method of claim 1 wherein the server computer is not the same server computer that multicast the first and second file fragments.

4. The method of claim 3 wherein the server computer is identified in a separately transmitted packet.

5. The method of claim 1 wherein the first and second file fragments are multicast in separate packets to the plurality of client computers in a plurality of rounds.

6. The method of claim 1 wherein the first and second file fragments are each received in separate packets that are separate from another packet that announces the number of file fragments comprising the virus pattern file.

7. The method of claim 1 wherein the packet payload indicates file fragment ID's of other file fragments that have not been received from a multicast.

8. A computer having memory and a processor for executing computer-readable program code in the memory, comprising:
an antivirus program;
an update manager configured to receive file fragments of a virus pattern file for the antivirus program sent by a first server computer to a plurality of client computers having corresponding antivirus programs and belonging to a multicast group by multicast file transmissions and to receive a particular file fragment missed by the computer from the multicast file transmissions, the particular file fragment being sent to the computer by a second server computer by unicast file transmission, the update manager being configured to receive a packet indicating a number of file fragments comprising the virus pattern file and identifying the second server computer configured to provide the particular file fragment missed by the computer from the multicast file transmissions, the update manager being configured to use the number of file fragments to determine that the particular file fragment is missing and to identify the particular file fragment to the second server computer in a packet payload identifying a file fragment ID of the particular file fragment; and
a file handler configured to assemble the file fragments into the virus pattern file.

9. The computer of claim 8 wherein the first and second server computers are separate computers.

10. The computer of claim 8 wherein an address of the second server computer is indicated in a separate multicast file transmission to the computer and the plurality of client computers.

11. The computer of claim 8 wherein the multicast file transmissions are performed in a plurality of rounds.

12. The computer of claim 8 wherein the unicast file transmission comprises TCP/IP one-to-one communication.

\* \* \* \* \*